United States Patent [19]

Sampei et al.

[11] Patent Number: 5,648,883
[45] Date of Patent: Jul. 15, 1997

[54] DISC DRIVE HAVING POSITIONAL SHIFT ADJUSTMENT

[75] Inventors: Hiroshi Sampei; Kouichi Hosoya; Kenji Katoh; Masashi Sato, all of Yamagata; Mitsutoshi Ohizumi, Tendou; Koichi Seno, Tendou; Hisateru Komatsu, Tendou; Takashi Watanabe, Tendou; Makoto Konno, Tendou; Akira Shibata, Yamagata, all of Japan

[73] Assignee: Mitsumi Electric Co., Ltd., Tokyo, Japan

[21] Appl. No.: 355,606

[22] Filed: Dec. 14, 1994

[30] Foreign Application Priority Data

Jun. 10, 1994 [JP] Japan .................................. 6-129356
Jul. 29, 1994 [JP] Japan .................................. 6-197785

[51] Int. Cl.⁶ .................................................. G11B 5/55
[52] U.S. Cl. ................................................. 360/106; 369/223
[58] Field of Search .............................. 360/97.02, 97.03, 360/97.04, 105, 106, 104; 369/219, 223, 220, 244, 247

[56] References Cited

U.S. PATENT DOCUMENTS

| | | | |
|---|---|---|---|
| 3,723,980 | 3/1973 | Gabor | 360/97.02 |
| 4,788,677 | 11/1988 | Ikedo et al. | 369/223 |
| 4,796,121 | 1/1989 | Adamek et al. | 360/97.02 |
| 4,814,908 | 3/1989 | Schmitz | 360/109 |
| 5,140,482 | 8/1992 | Kimura et al. | 360/104 |
| 5,189,578 | 2/1993 | Mori et al. | 360/106 |
| 5,303,105 | 4/1994 | Jorgensen | 360/106 |
| 5,440,437 | 8/1995 | Sanada et al. | 360/104 |
| 5,440,438 | 8/1995 | Saito | 360/106 |

*Primary Examiner*—Stuart S. Levy
*Assistant Examiner*—Kevin M. Watkins
*Attorney, Agent, or Firm*—Knobbe, Martens, Olson & Bear, LLP

[57] ABSTRACT

An improved disc drive is capable of compensating the relative positional shift of a head caused mainly by a temperature change. The disc drive includes a frame having a disc holder for rotatably driving a disc, a head for reading information recorded in the disc, a head carriage which is movable in a predetermined radial direction of the disc, a rotation shaft extending in parallel with the radial direction, a driving mechanism for moving the head carriage in the radial direction by engaging with the rotation shaft, an adjustment mechanism for compensating the positional shift of the head due to a change of ambient temperature by providing an additional deformation of the adjustment mechanism to the carriage.

11 Claims, 9 Drawing Sheets

DISC DRIVE HAVING POSITIONAL SHIFT ADJUSTMENT

FIELD OF THE INVENTION

The present invention relates to a disc drive, and more particularly, to an improved disc drive for preventing and compensating a positional shift of a read/write head caused by a change of ambient temperature and other environmental changes.

BACKGROUND OF THE INVENTION

Two types of disc drive are currently well known: a magnetic disc drive wherein information recorded on a magnetic disc is read out by a magnetic head; and, a so-called optical disc drive (including an optical magnetic disc drive) wherein information recorded on a disc such as a compact disc is read out by an optical head.

FIG. 9 illustrates a structure in a periphery of a head carriage of a conventional magnetic disc drive. The magnetic disc drive is a device which is used to drive a magnetic disc such as a flexible disc (not shown). The magnetic disc is inserted into the magnetic disc drive from a direction as shown by an arrow A in FIG. 9. The inserted magnetic disc is held on a disc holder 11 wherein a center axis of each part is matched each other. The disc holder 11 is rotatably supported through a spring 12 on the surface of a frame 13. The disc holder 11 is rotatably driven by a motor (not shown) provided below the frame 13, allowing the magnetic disc to rotate. A printed circuit board (not shown) loaded with many electronic components is also provided underneath the frame 13.

The magnetic disc drive includes a magnetic head 14 for reading/writing data in the magnetic disc. The magnetic head 14 is supported by a head carriage 15. As will be described in the following, the head carriage 15 is positioned apart from the frame 13 on the surface of the frame 13. The magnetic head 14 is movably supported in a predetermined radial direction (as shown in an arrow B in FIG. 9) of the magnetic disc.

A stepping motor 16 is fixed on a side wall 131 of the frame 13. The stepping motor 16 drives the head carriage 15 along the radial direction B. In more details, the stepping motor 16 includes a rotation (drive) shaft 161 extending therefrom in a parallel direction with the radial direction B, wherein the rotation shaft 161 is shaped in a male screw. An end of the rotational shaft 161 is supported by a bearing 132a on a bend 132 cut out from the frame 13. By means of the bearing 132a, the rotation shaft 161 is directed to extend in the parallel direction with the radial direction B and rotatably supported. The head carriage 15 includes a carriage arm 151 extending therefrom to the rotation shaft 161, wherein a pin 151a is provided on an end of the carriage arm 151 so as to engage with a groove of the male screw of the rotation shaft 161.

Therefore, if the rotation shaft 161 of the stepping motor 16 rotates, the pin 151a of the arm 151 moves along the groove of the male screw of the rotation shaft 161. As a result, the head carriage 15 also moves along the predetermined radial direction B. Thus, the stepping motor 16 functions as a driving means for moving the head carriage 15 along the predetermined radial direction B.

One side of the head carriage 15 is movably supported by the rotation shaft 161 of the stepping motor 16 and arranged to be apart from the frame 13. However, it is not sufficient to support an entire head carriage 15 only by the rotation shaft 161. For the other side of the head carriage 15, another supporting and guiding means is needed. For such a purpose, in this example, a guide bar 17 is provided as a guiding means. Namely, the guide bar 17 is provided in the opposite side of the rotation shaft 161 of the stepping motor 16, having the head carriage 15 in the middle. The guide bar 17 is extended in the predetermined radial direction B. Both ends 171 and 172 of the guide bar 17 are fixed on the surface of the frame 13 so as to guide the head carriage 15 in the radial direction B, as will be described in more detail later. Therefore, the head carriage 15 is entirely kept apart from the surface of the frame 13. Further, a lead wire 15b is extended from the head carriage 15 toward the guide bar 17. The lead wire 15b is connected to the printed circuit board mounted underneath the frame 13.

The guide bar 17 is clamped by a clamp 18 on the surface of the frame 13. The clamp 18 is fixed on the surface of the frame 13 by a screw 19. The clamp 18 includes clamping parts 181 and 182 on its both ends for clamping the both ends 171 and 172 of the guide bar 17.

In this type of conventional magnetic disc driver, the following inspection and adjustment are performed with respect to the positional shift of the magnetic head. For example, a 3.5 inch magnetic disc which commonly contains 80 tracks is adjusted so that the magnetic head transmits a so-called cat's eye signal as shown in FIG. 10A when the magnetic head is positioned in a track, for instance, the 40th track. Namely, when the symmetrical pattern of the cat's eye signal as shown in FIG. 10B is obtained, it means that a reading/writing gap of the magnetic head is positioning in the center of the predetermined track of the disc.

The above operation is preferably performed under such environment where the ambient temperature is around 20° C. However, in reality, the disc drive may be used under other conditions where the ambient temperature is higher than 50° C. or lower than 0° C. It is a characteristic of the magnetic disc, the frame 13 and the head carriage 15 that these components are expanded under such higher temperature and shrunken under the lower temperature. This temperature change causes a positional shift of the magnetic head, which is called a thermal off-track. For example, the position of the magnetic head shifts to the inner side of the track if the temperature is higher than 50° C., causing the asymmetrical cat's eye signal as shown in FIG. 10B. If the temperature is lower than 0° C., the position of the magnetic head shifts to the outer side of the track, causing the asymmetrical cat's eye signal as shown in FIG. 10C.

Another type of a magnetic disk drive which is similar to that of FIG. 9 is shown in FIG. 11. This magnetic disk drive system 250 possesses a carriage 220 whose main component is made of composite resin and has a side-opening shape which can cover a magnetic disk D that is to be rotated by a rotational table 212. At this carriage 220, a movable magnetic head 224 is provided to an upper portion 221 which is designed to move up and down. Also, a fixed magnetic head 225 is provided to a lower portion 222 of the carriage 220. The magnetic disk D is inserted between the movable magnetic head 224 and the fixed magnetic head 225, and is guided by a guide rod 214 so that the magnetic disk D can move in its rotational direction.

As shown in FIG. 11, at the side of carriage 220, a rotation shaft 218 having a screw and rotatably driven by a motor 217 is provided in a manner to be parallel with the moving direction, i.e., in parallel with the above mentioned guide rod 214. Also, at the side of the carriage 220, there is integrally provided an arm 240 for orthogonally coupling the rotational shaft 218 to a side of the carriage 220. The arm 240 has a pin 241 at its tip such that the pin 224 engages the screws of the rotation shaft 218.

In this conventional magnetic disk drive, a relatively large space L is required between the rotational shaft 218 and the carriage 220 because of the reasons determined by the layout of various components. Thus, the arm 240 is required to be relatively long. In this structure, there is a possibility that the carriage 220 sways along the moving direction as shown in an arrow S in FIG. 12 because of the influence of conditional changes such as temperature and humidity, since the arm 240 is made of composite resin integral with the carriage 220 and has a cantilever form. If the arm 240 sways like this manner, memory retrieval operations with respect to the magnetic disk will be adversely affected (such as an increase in the absolute value of a thermal off-track). In such a situation, it may be possible to utilize metal of high rigidity for the arm 240, however, such a use of metal in the arm will increase the cost of the disk drive.

SUMMARY OF THE INVENTION

Therefore, it is an object of the present invention to provide a disc drive which is capable of compensating the thermal off-track.

The disc driver of first aspect of the present invention includes: a frame having a disc holder for rotatably driving a disc; a head for reading information recorded in the disc; a head carriage provided on the frame and is movable in a predetermined radial direction; a rotation shaft extending in parallel with the predetermined radial direction; a driving means moving the head carriage in the radial direction by engaging one part of the head carriage with the rotation shaft; and, an adjustment means adjusting the positional shift of the head due to a deformation of the head caused by a change of ambient temperature.

In the above arrangement, the rotation shaft is formed of a male screw. Further, the head carriage is partially comprised of: a carriage arm extending from the rear part of the head carriage to the rotation shaft; and, a pin provided on an end of the carriage arm, wherein the pin is engaged with the male screw of the rotation shaft.

According to the present invention, the adjustment means provided on the carriage arm is made of a member of materials having a different thermal expansion coefficient from that of the carriage arm. The disc drive of the present invention corrects the positional shift of the head by using a deformation effect of the carriage arm caused by the change of the ambient temperature, utilizing the engaging portion of the pin and rotation shaft as a supporting point.

If the frame is made of iron and the carriage arm is made of polycarbonate, the materials for the adjustment member should be resin or metal. The adjustment member is fitted in a recessed portion provided along a longitudinal direction of the carriage arm. If a material like resin is used for the adjustment member, the adjustment member can be integrally formed with the carriage arm by a bicolor molding process.

Alternatively, hooks are provided on both ends of the adjustment member such that the hooks mate with corresponding parts of the recessed portion.

Furthermore, the adjustment member can be shaped in a bar screw. The bar-screw shaped adjustment member is inserted from one end of the carriage arm to the other end so that the screw is arranged to cross the recessed portion. It is also possible to provide a slit or hole at the bottom of the carriage arm in order to expedite the deformation of the carriage arm.

In another embodiment of the present invention, the adjustment means is comprised of the rotation shaft and a bearing. This aspect of the invention is characterized in that: the rotation shaft is rotatably driven by a motor, wherein the motor is being pressed by a spring so that the drive shaft is pushed toward the bearing; one end of the rotation shaft is supported by the bearing, wherein the bearing is made of materials having a different thermal expansion coefficient from that of the disc. According to this modified embodiment of the present invention, it is possible to provide a disc drive which can compensate the positional shift of the head by displacing the rotation shaft in its axial direction due to the change of the ambient temperature, whereby the head carriage is also displaced through the pin.

In a further modified embodiment of the present invention, the rotation shaft solely functions as the adjustment means. This aspect of invention is characterized in that: the rotation shaft is rotatably driven by the motor, wherein one end of the rotation shaft is supported by the bearing; the motor is being pressed by a spring so that the rotation shaft is pushed toward the bearing; the rotation shaft is made of metallic or resin material having a different thermal expansion coefficient from that of the disc. According to this modified embodiment of the present invention, it is possible to provide a disc drive which can compensate the positional shift of the head by displacing the rotation shaft in its axial direction due to the change of the ambient temperature, whereby the head carriage is also displaced through the pin.

As described in the foregoing, the present invention mainly focuses on the positional compensation for the thermal off-track. Namely, since the disc, the frame and the head carriage are made of materials having different thermal expansion coefficients from each other, the degree of the deformation is also different from each other due to the change of the ambient temperature, which causes the thermal off-track. The adjustment means of the present invention is intended to correct the thermal off-track by utilizing a deformation effect caused by the change of the ambient temperature, whereby the head carriage is accordingly displaced by this deformation effect in a manner which can compensate the thermal off-track.

It is another object of the present invention to provide a disk drive which is capable of minimizing adverse effects on a data retrieval operation from the disc by preventing the unwanted sway in the head even when there is a relatively large space between the rotation shaft and the carriage. It is a further object of the present invention to provide a disk drive which is capable of reducing the cost.

To achieve this objective, the disc drive of the present invention includes: a carriage whose main components are made of composite resin and has a side-opening shape to cover the disc and the carriage is provided with an upper portion and a lower portion where a movable magnetic head and a fixed magnetic head are respectively mounted, the carriage is designed to move in a radial direction of a disc which is rotatably inserted between the movable magnetic head and the fixed magnetic head on a rotation table; a rotation shaft having a screw thereon and arranged in parallel with the moving direction of the carriage; an arm made of composite resin provided perpendicular to a side of the carriage and having a pin on its end in order to engage the rotation shaft to bridge the carriage and the rotation shaft; and is characterized that the width of the arm increases in a plan view as it approaches the carriage.

Since the width of the arm increases as it approaches the carriage, the rigidity of the arm in its transverse direction is enhanced, and as a consequence, the sway or the positional shift of the arm is minimized in the direction of the carriage movement.

As a result, the disc drive of the present invention can eliminate or minimize the positional change or sway in the arm connecting the cartridge and the rotation shaft even if there exists a relatively large space between the rotation shaft and the carriage. Therefore, the disc drive of the present invention can decrease the absolute value of the thermal off-track and minimize unwanted effects on the data retrieval process in the disc. Also, the cost for this structure will not be increased since the arm and the carriage can be integrally made of composite resin as in the same way of the conventional disc drive.

DETAILED DESCRIPTION OF THE INVENTION

Figure 1:
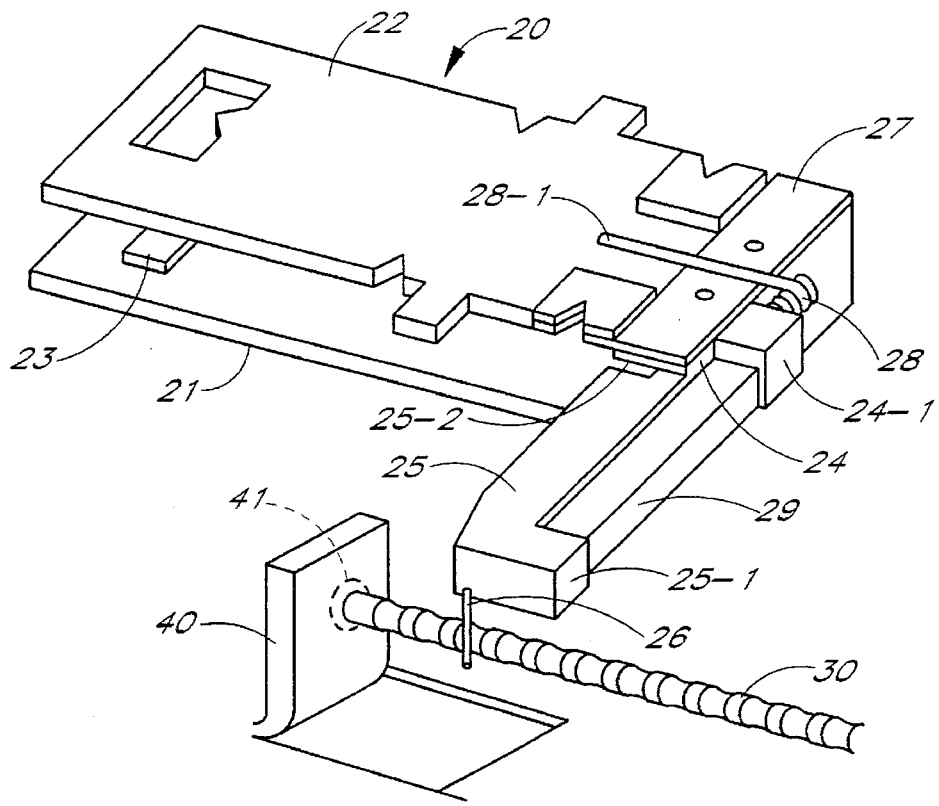
FIG. 1 is a perspective view showing main parts of one embodiment of the present invention.

The preferred embodiments of the present invention are discussed in the following with reference to the drawings.
Thermal Compensation FIG. 1 shows an embodiment of a head carriage 20 and related parts, applying the present invention to a magnetic disc drive. The head carriage 20 is comprised of a lower carriage 21 and an upper carriage 22. Magnetic heads 23 are respectively mounted on the bottom surface of the upper carriage 22 at its one end (not shown) and the top surface of the lower carriage 21 at its one end. On the other end of the lower carriage 21, a holder 24 is integrally provided. One end of the holder 24 is extended toward a rotation shaft 30 so as to form a carriage arm 25. On one end of the carriage arm 25, a pin 26 is provided, wherein the pin 26 is engaged with the groove of the male screw formed on the rotation shaft 30. The end of the drive shaft 30 is supported by a bearing 41 of a bend 40, which is a cut out of the frame, similar to the conventional method.

Since the upper carriage 22 is fixed on the holder 24 through a spring plate 27, it can be lifted and opened in the upper direction. The magnetic disc (not shown) is inserted between the upper and lower carriages 21 and 22 when the upper carriage 22 is opened. After the insertion of the disc, the upper carriage 22 is closed so that each magnetic head is positioned in a vicinity of the magnetic disc.

A spring mounting part 24-1 is projected from a rear side of the holder 24, whereon a coil spring 28 is provided. An extending part 28-1 of the coil spring 28 is extended and attached to the upper surface of the upper carriage 22. This extending part 28-1 functions as a spring to return the upper carriage 22 to the initial position so that the head 23 is pressed to the magnetic disc.

In this embodiment, a projecting part 25-1 is provided at the end of the carriage arm 25, whereby a recess is formed between the projecting part 25-1 and the spring mounting part 24-1. An adjustment piece 29 is fitted in this recess so as to provide an adjustment means for correcting the thermal off-track. For example, if the carriage arm 25 is made of a material such as polycarbonate and the frame is made of iron, the adjustment piece 29 should be made of a resin material having a larger thermal expansion coefficient, such as polyphenylene sulfide, polyacetal, or metal such as aluminum or brass. Not only the pure polycarbonate but also the polycarbonate mixed with 30% glass can also be used for the adjustment piece 29.

In reference to FIG. 2, an operation of the adjustment piece 29 is discussed in the following. The adjustment piece 29 has the same length as a distance L between the spring mounting part 24-1 and the projecting part 25-1 under the room temperature. When the ambient temperature is 80 ° C., the carriage arm 25 is expanded to the longitudinal direction (direction A') and thus the distance L is also expanded for ΔL. In this situation, the position of the head 23 changes to the center of the magnetic disc (direction B), i.e., to an inner side of a track.

Figure 9:
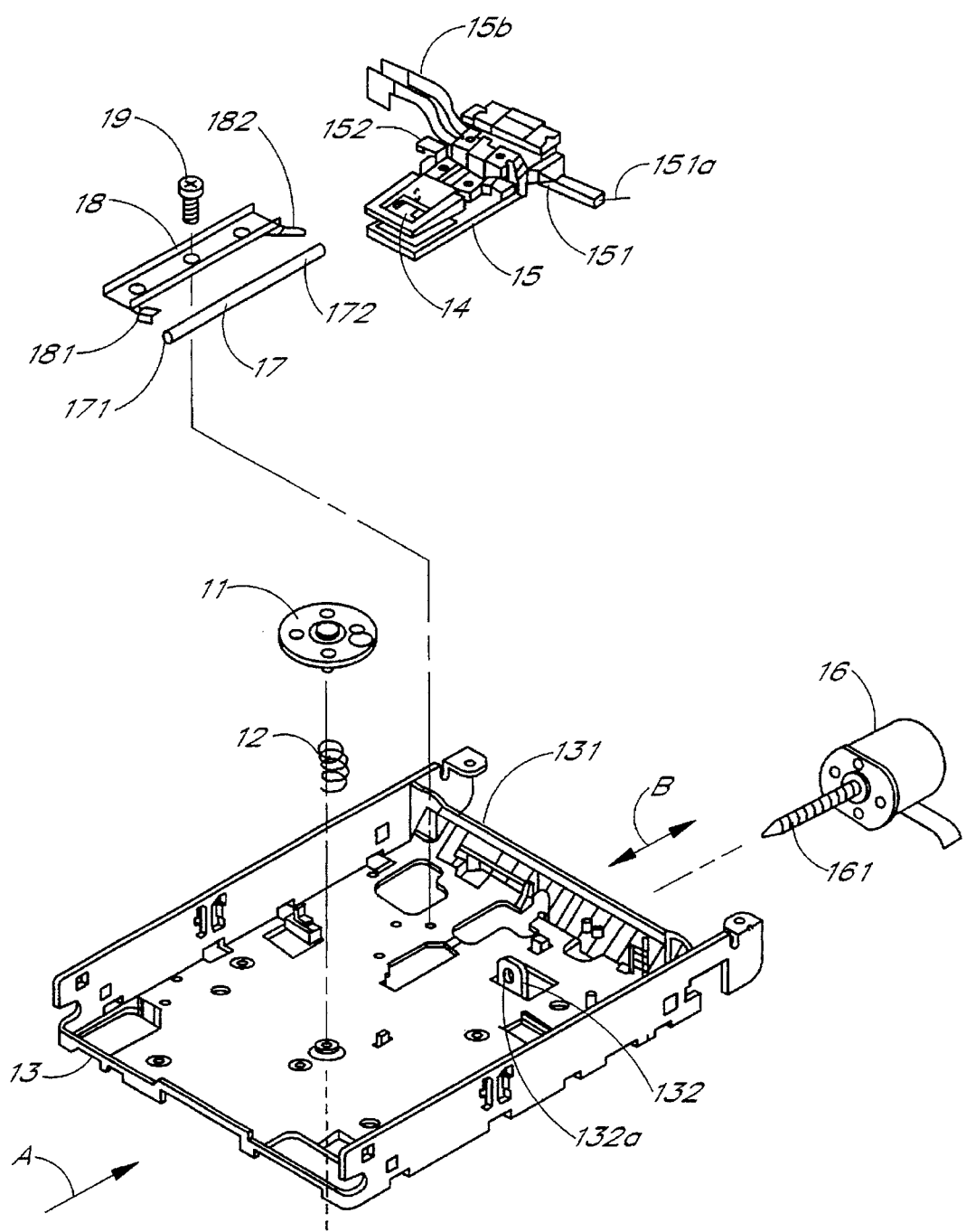
FIG. 9 is an exploded view showing the inside structure of the magnetic disc driver of the conventional disc drive.
Figure 10A:
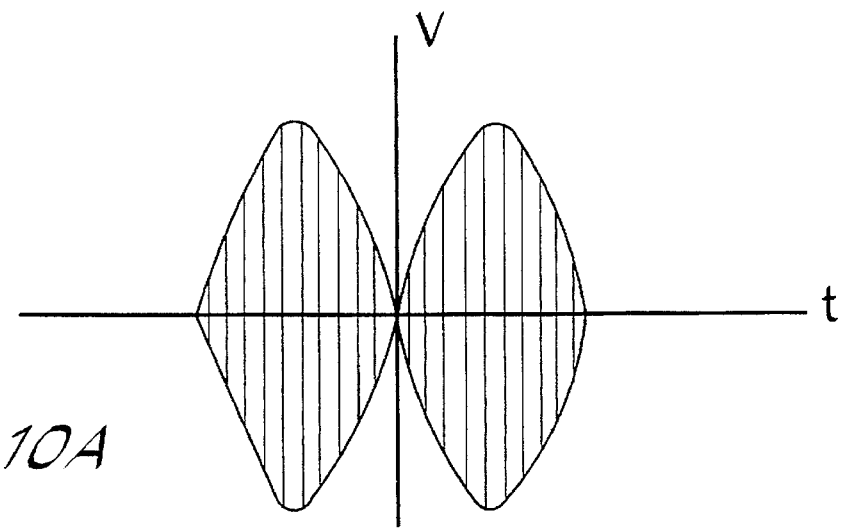
FIGS. 10A–10C are diagrams showing signal waveforms in order to explain the thermal off-track caused in the conventional disc drive of FIG. 9.
Figure 10B:
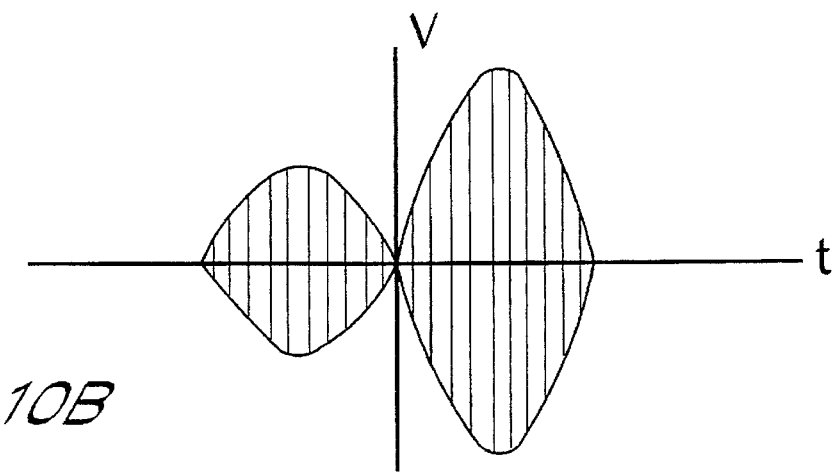
Figure 10C:
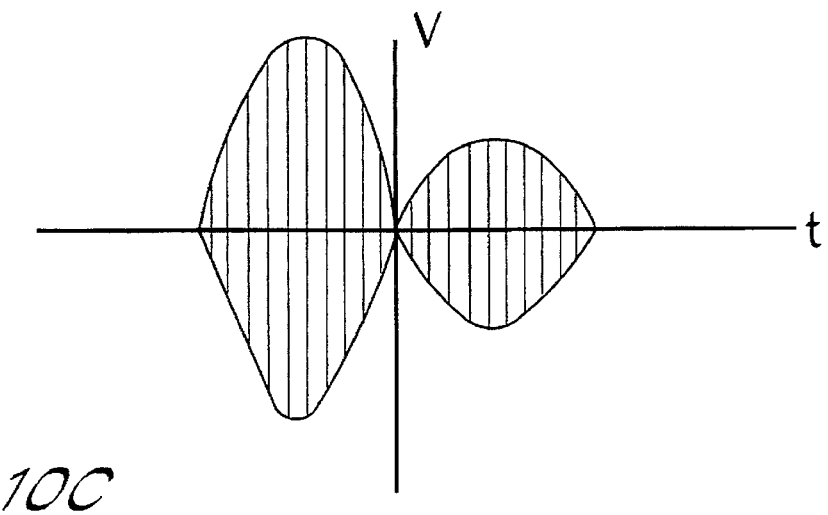

However, as discussed above, since the adjustment piece 29 has a larger thermal expansion coefficient than that of the carriage arm 25, the adjustment piece 29 expands in a greater extent than the expansion rate ΔL of the distance L. Due to the expansion of the adjustment piece 29, a stress is applied to the projecting part 25-1 of the carriage arm 25 in a direction as shown by an arrow C. Since the pin 26 is engaged with the groove of the rotation shaft 30 and the head carriage 20 is movable in both A and B directions by means of a guide bar 17 (shown FIG. 9), by the stress in the direction C, the head carriage 20 moves to the direction A with respect to the supporting point where the pin 26 and the rotation shaft 30 are engaged. As a result, the thermal off-track of the magnetic head is adjusted. Conversely, if the ambient temperature is below 0° C., for example, the carriage arm 25 is shrunken in a direction B'. As a result, the head 23 which is shifted to an outer side of a track is compensated to come back to the predetermined position.

Figure 2:
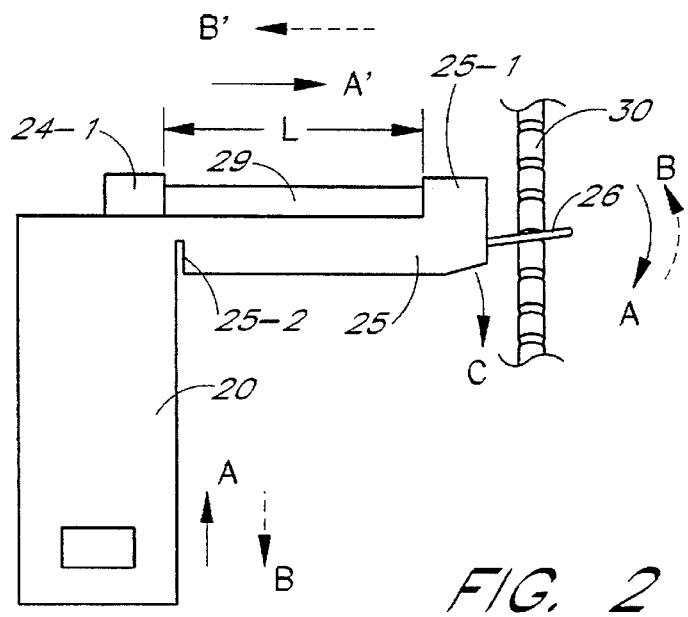
FIG. 2 is a plan view illustrating an operation of an adjustment piece shown in FIG. 1.

In FIGS. 1 and 2, preferably, a slit 25-2 is provided at the bottom of the carriage 25. This slit allows the carriage arm 25 to be easily deformed when the stress is applied to the projecting part 25-1 due to the expansion or contraction effect of the adjustment piece 29. Of course, the slit 25-2 can be replaced with other structures such as a hole.

The material and length of the adjustment piece 29 is determined depending on the amount of the deformation and positional shift of the magnetic disc, the frame 13 (FIGS. 9) and the head carriage 20 due to the change of the ambient temperature.

Figure 3:
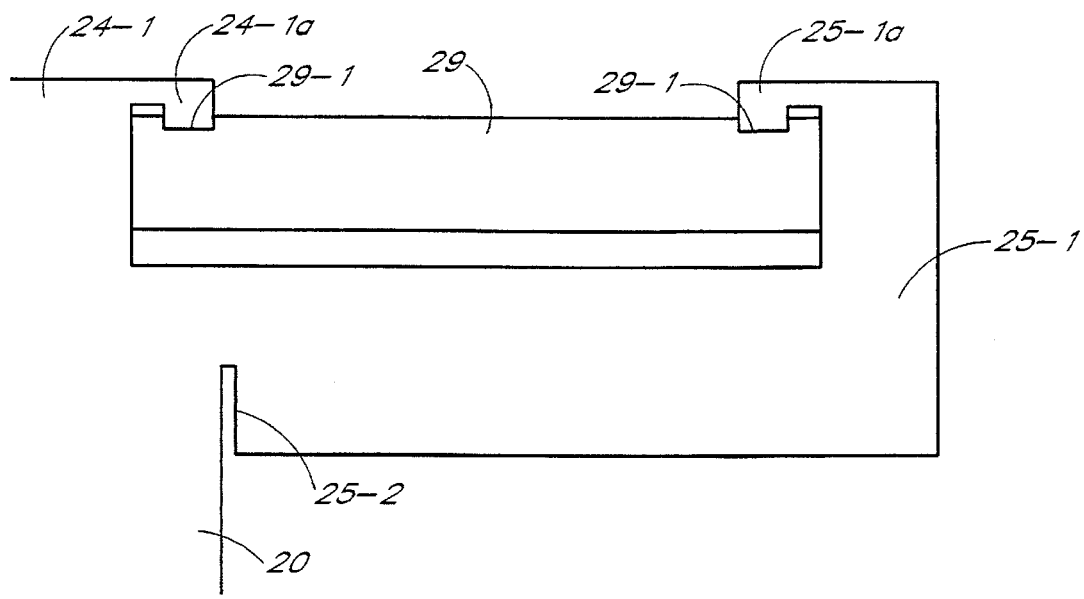
FIG. 3 is a plan view showing another example of an assembly of the adjustment piece as shown in FIG. 1.

In FIGS. 1 and 2, the adjustment piece 29 is fixed in the recess of the carriage arm 25. However, the adjustment piece 29 can be alternatively assembled as shown in another example of FIG. 3. In FIG. 3, hooks 24-1a and 25-1a are respectively provided on the spring mounting part 24-1 and projecting part 25-1. On the adjustment piece 29, concave portions 29-1 are provided so that the concave portions 29-1 are engaged with the corresponding hooks 24-1a and 25-1a. By means of these hooks, the stress can be certainly applied to the carriage arm 25 when the adjustment piece 29 is expanded and shrunken.

Figure 4:
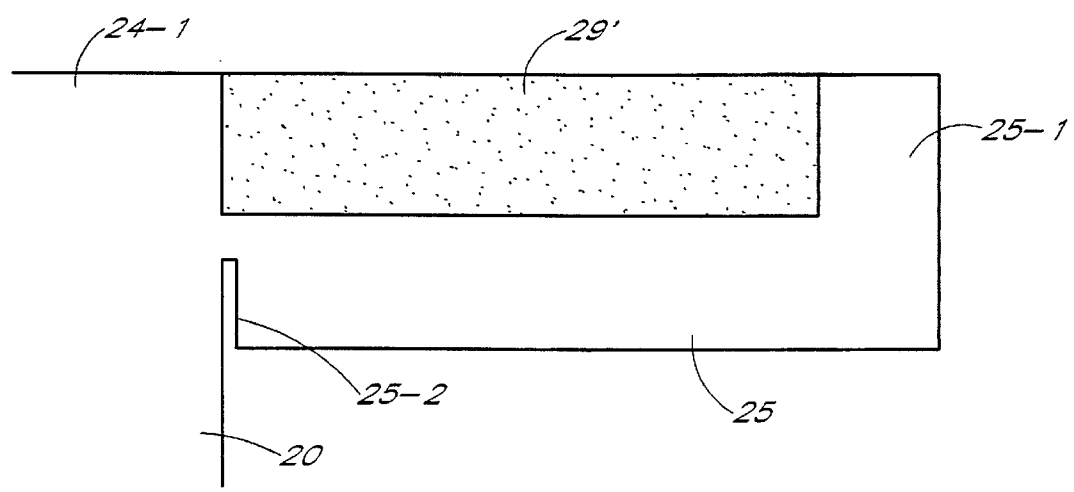
FIG. 4 is a plan view showing another example of the adjustment piece as shown in FIG. 1.

FIG. 4 shows another example of the present invention in which the adjustment piece 29 is made of the resin material. In this example, the head carriage 20 and carriage arm 25 are integrally formed with the adjustment piece 29 by the bicolor molding process, wherein the head carriage 20 and carriage arm 25 are made of polycarbonate and the adjustment piece 29 is made of polyphenylene sulfide. By means of this integral structure, the stress is certainly applied to the projection part 25-1 of the carriage arm 25 by the expansion/contraction effect of the adjustment piece 29. The combination of the materials in the bicolor molding process does not have to be limited as in the foregoing combination. Any materials can be allowed as long as the adjustment piece 29 has the larger thermal expansion coefficient than that of the head carriage 20 and the carriage arm 25.

Figure 5:
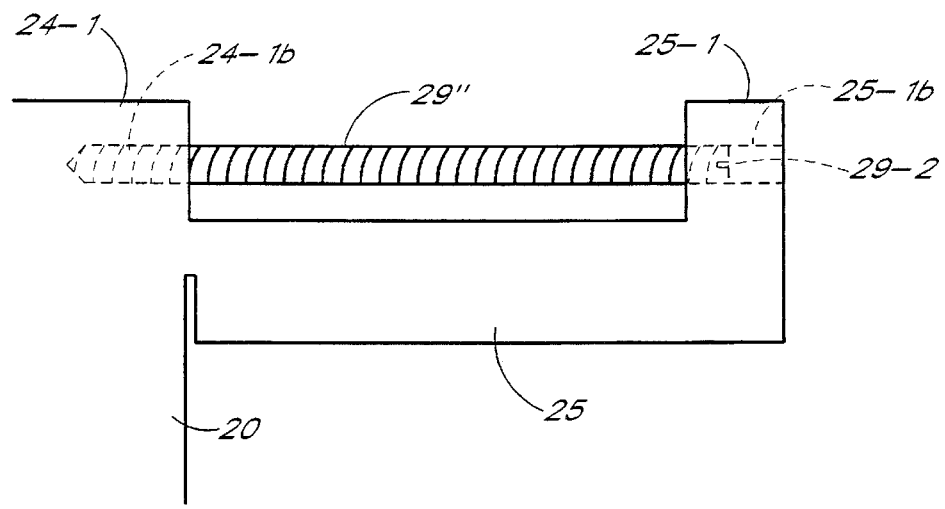
FIG. 5 is a plan view showing another example of the adjustment piece as shown in FIG. 1.

FIG. 5 shows another example of the present invention in which the adjustment piece 29 is realized in a screw so as to simplify the assembly process. A hole 24-1b is provided in the longitudinal direction of the spring mounting part 24-1. A through hole 25-1b is provided in the projecting part 25-1. A screw driver is applied on a slit 29-2 at the top of a screw member 29". Then, the screw member 29" is inserted into the hole 24-1b so as to cross the recessed part provided between the screw mounting part 24-1 and projecting part 25-1. As has been described in the foregoing, the screw member 29" can be made of any materials such as resin or metal as long as it has a larger thermal expansion coefficient than that of the carriage arm 25.

Figure 6:
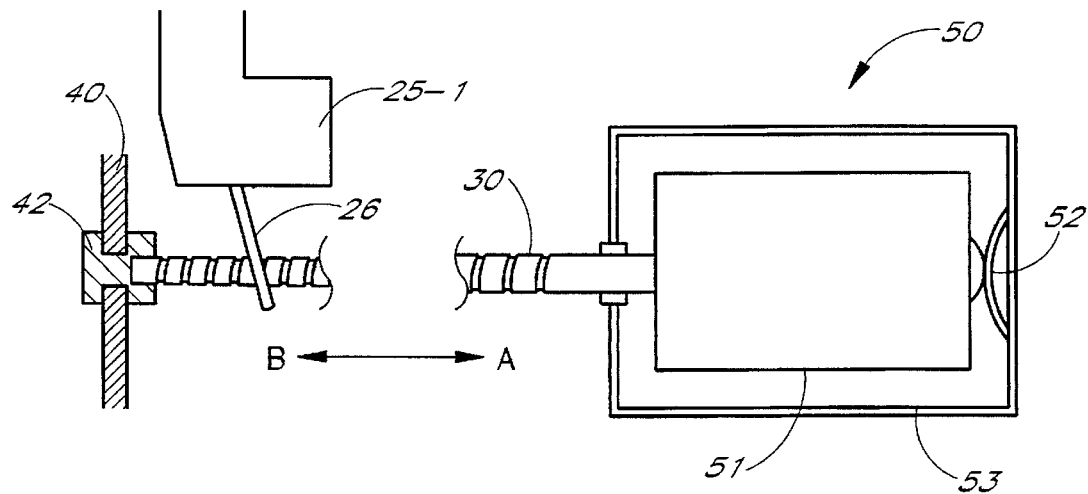
FIG. 6 is a perspective view showing main parts of another embodiment of the present invention.
Figure 7:
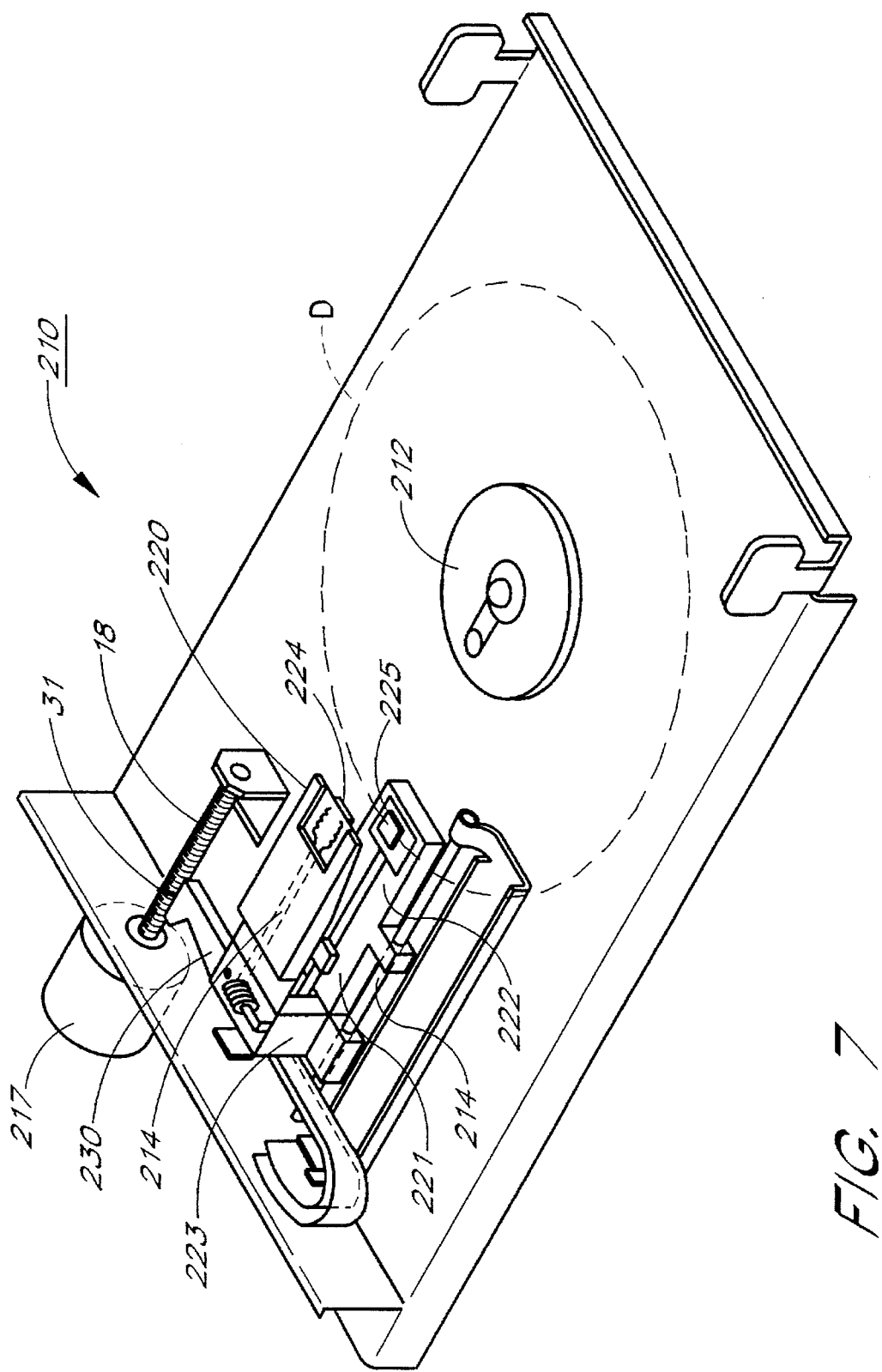
FIG. 7 is a perspective view showing main components of an example of the magnetic disk drive system of the present invention.

FIG. 6 shows a modified embodiment of the present invention in which the adjustment means is comprised of the rotation shaft 30 and bearing member 42. The bearing member 42 is made of material having a larger thermal expansion coefficient than that of the carriage arm 25, the magnetic disc and the frame 13 (FIGS. 7). When the bearing member 42 is expanded under the high temperature, that expansion is transmitted to the rotation shaft 30, resulting the displacement of the rotation shaft 30 in the direction A in FIG. 6. This displacement of the rotation shaft 30 is transmitted to the head carriage 20 through the pin 26 which is engaged in the groove of the rotation shaft 30. As a result, the magnetic head is displaced in the A direction, in a manner same as in FIG. 2. It is regardless to say that, under the low temperature, the magnetic head is displaced in the B direction in FIG. 2. This embodiment is particularly advantageous when it is difficult to assemble the adjustment piece because the length of the carriage arm 25 is too small. The displacement of the rotation shaft 30 in the axial direction can be explained as follows.

The stepping motor 50 is usually stored in a case 53, wherein a motor body 51 is being pressed toward the rotation shaft 30 by a plate spring 52 located in an opposite end from the rotation shaft 30. Thus, the rotation shaft 30 can be displaced in both A and B directions due to the expansion/shrinkage of the bearing member 42.

Alternatively, as a modification of the embodiment of FIG. 6, it is possible to arrange that the rotation shaft 30 solely functions as the adjustment means while the bearing member 42 is an ordinary bearing. The rotation shaft 30 is made of resin, metal or other materials having a larger thermal expansion coefficient than that of the carriage arm 25, the magnetic disc and the frame. Also, in this modified structure, the head carriage 20 can be displaced through the pin 26 due to the expansion/shrinkage effects to compensate the thermal off-track.

In the foregoing, the present invention has been applied to the magnetic disc driver. However, it is apparent for one having ordinary skill in the art that the present invention can also be applied to disc drives of a compact disc, a laser disc, or disc drives in which a read/write head is driven by a head carriage.

As has been described in the foregoing, the present invention realizes a means for compensating the thermal off-track caused by the change of the ambient temperature with a simplified structure. Therefore, it is possible to provide an improved quality of disc drive at low cost which will not cause the thermal off-track under a high or low temperature environment.

Increasing Rigidity

Figure 8:
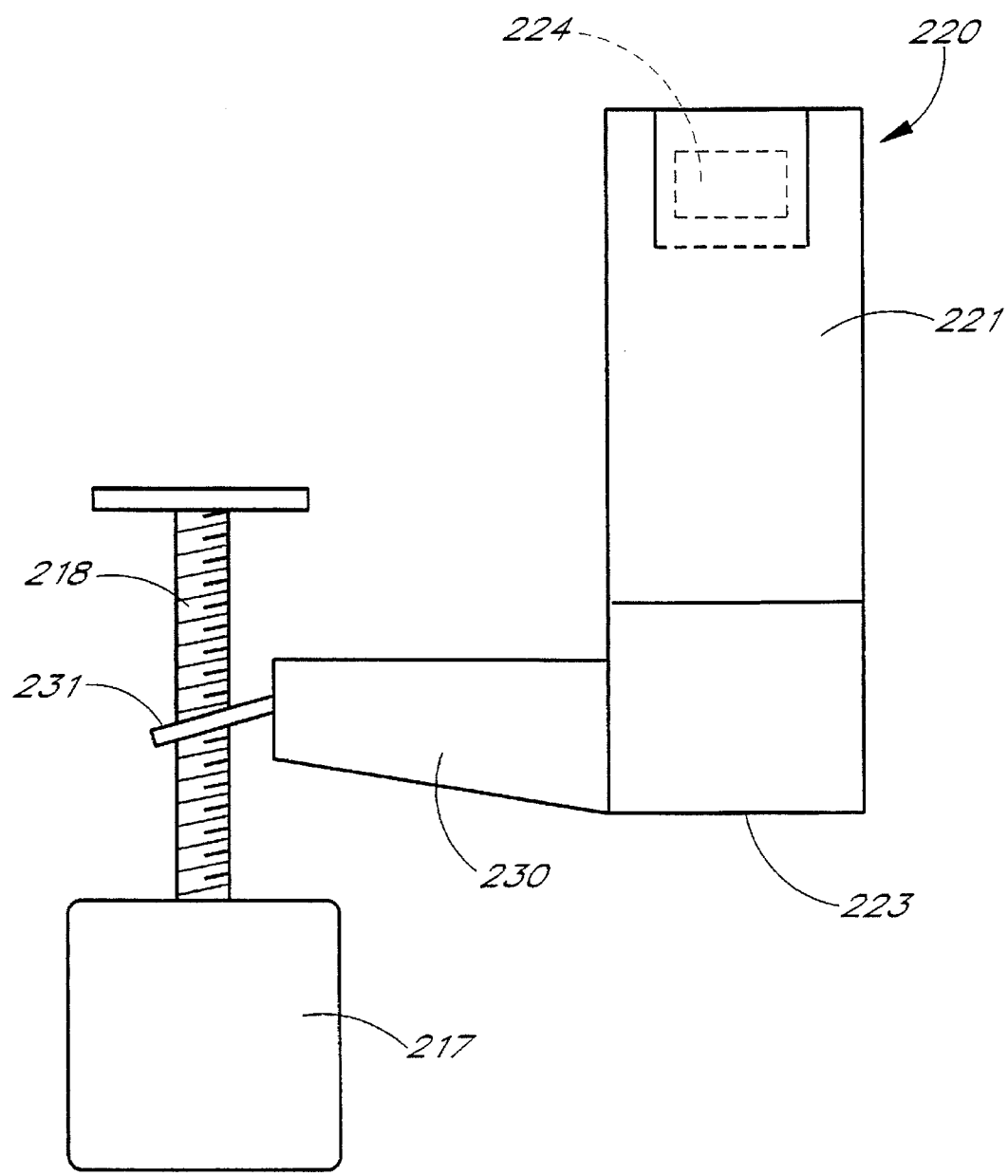
FIG. 8 is an exploded view showing the carriage and peripherals of FIG. 7.

Another aspect of the present invention is described with reference to FIGS. 7 and 8.

FIG. 7 shows an embodiment of the present magnetic disk drive system which is capable of preventing an arm for driving a read/write head from swaying under a temperature change or other causes. The magnetic disk drive system 210 has a carriage 220, a rotation shaft 218, and a carriage arm 230 just like the above mentioned conventional system 250 of FIGS. 11 and 12. The main components of the carriage 220 is made of composite resin. An upper portion 221 and a lower portion 222 of the carriage 220 have a movable magnetic head 224 and a fixed magnetic head 225, respectively. The carriage 220 also includes a side portion 223 interconnecting the upper portion 221 and the lower portion 222. A magnetic disk D, which is to be rotated by a rotation table 212, is inserted between the movable magnetic head 224 and the fixed magnetic head 225, and is guided by a guide rod 214 so that the magnetic disk D rotates in a predetermined direction.

The rotation shaft 218 is located in parallel to the moving direction of the carriage 220, i.e., in parallel with the guide rod 214, and is rotated by a motor 207.

Figure 11:
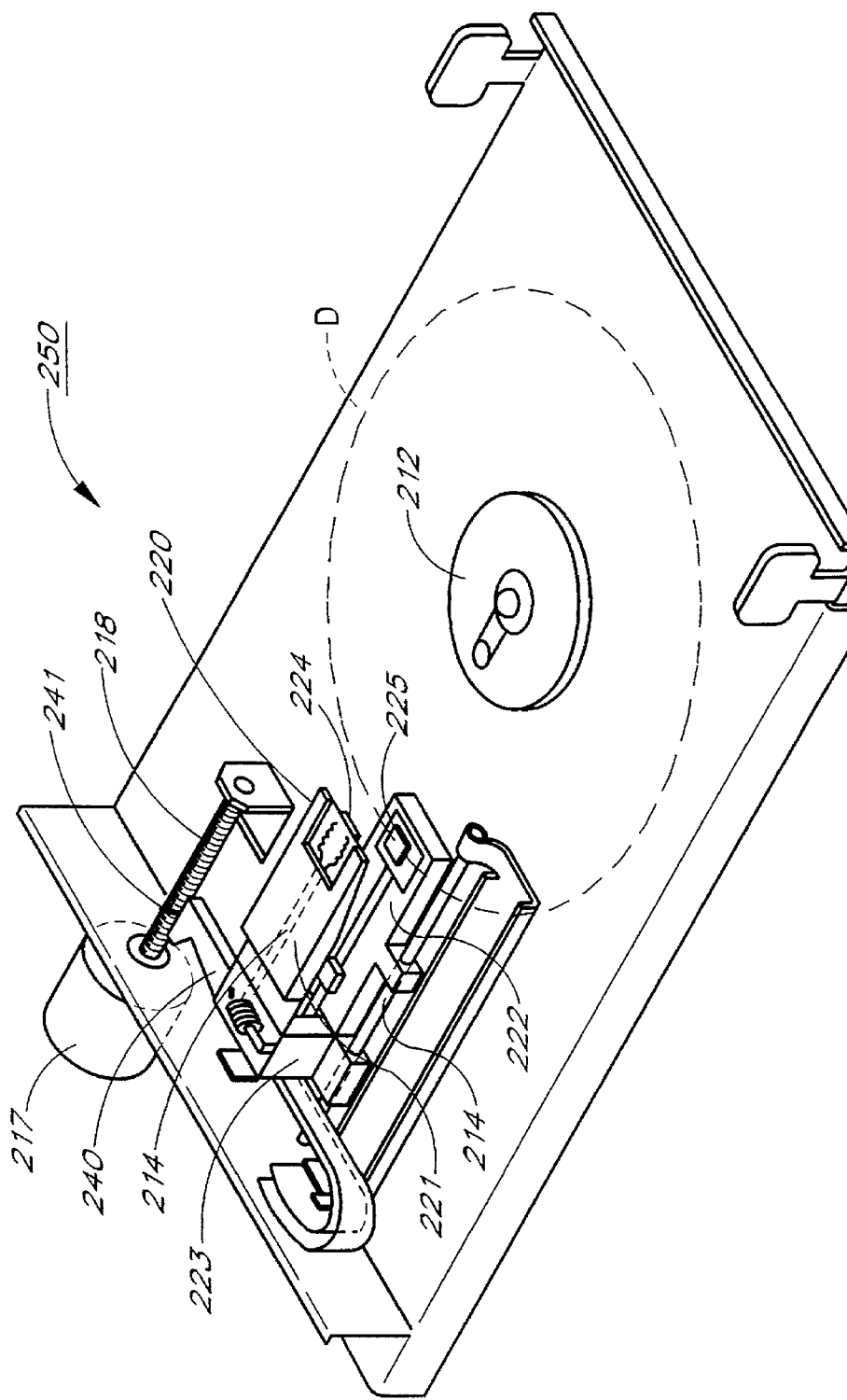
FIG. 11 is a perspective view showing main components of an example of the conventional magnetic disk drive system.
Figure 12:
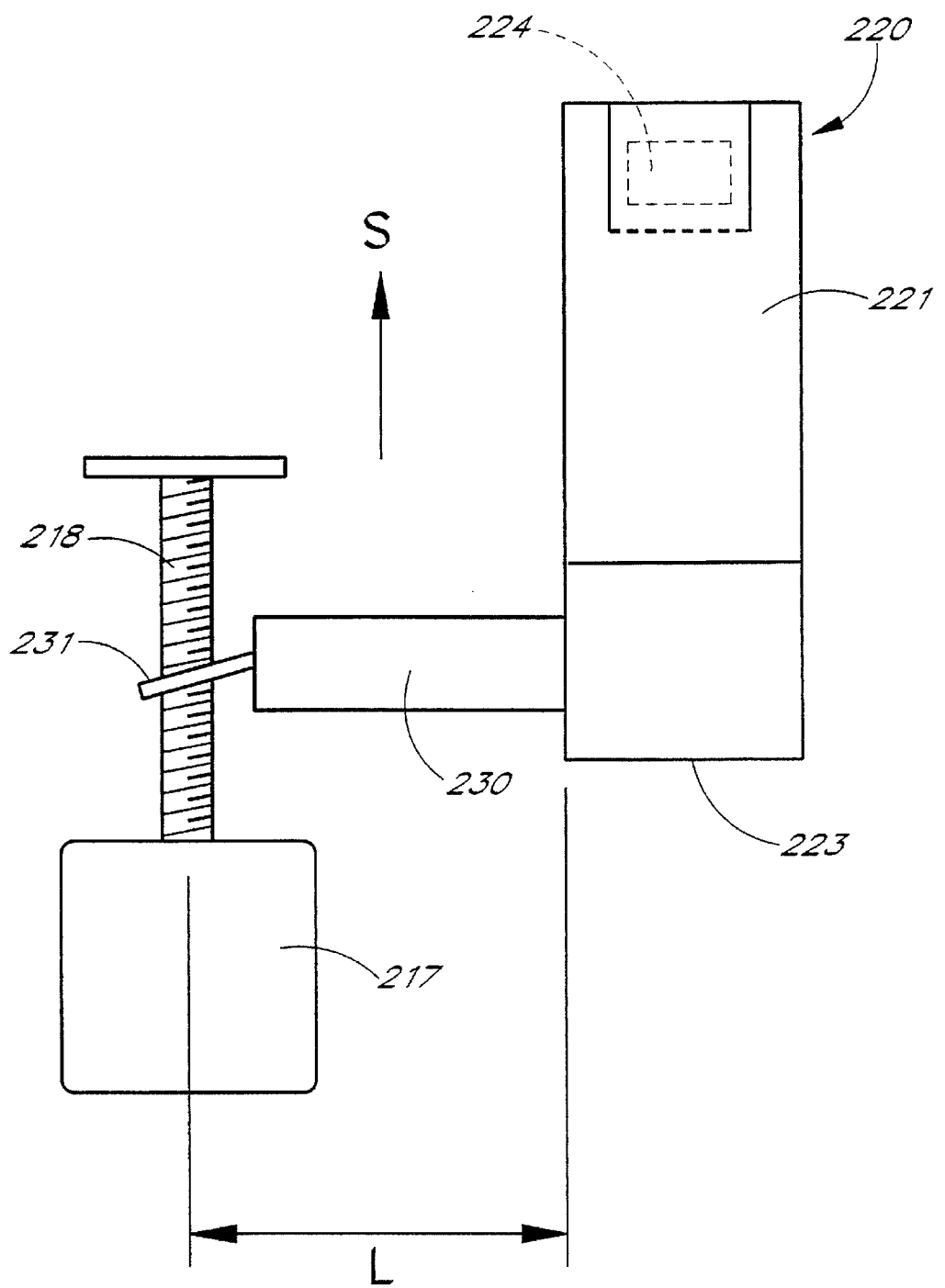
FIG. 12 is an exploded view showing the carriage and peripherals of FIG. 11.

Just like the conventional system of FIGS. 11 and 12, the arm 230 is fixed perpendicular to the carriage 220 so that the side portion 223 of the carriage 220 and the rotation shaft 218 are placed at the end of the carriage arm 230. However, as shown in detail in FIG. 8, the arm 230 of the present invention becomes wider as it approaches the root, i.e., an opposite end to the rotation shaft, and because the thickness is the same as conventional ones, the sectional area of the root is larger than that of conventional ones.

Since the width of the arm 230 is widened as it approaches the carriage 220, the rigidity of the arm 230 in a transversal direction considerably increases, and as consequence, it can prevent a sway of the arm 230 in a moving direction of the carriage 220.

As a result, the arm 230 itself prevents the sway or positional shift even when there is a relatively large space between the rotation shaft 218 and the carriage 220. Thus, the absolute value of the thermal off-track can be lowered and harmful effects on data retrieval process by the head from the magnetic disk D can be minimized. Moreover, it is cost effective to incorporate the structure in the arm 230 since the arm 230 and the carriage 220 can be integrally formed with the composite resin at the same time in the same way as in the conventional systems.

In the carriage 220 above, the upper portion 221 having the movable magnetic head 24 and the lower portion 222 having a fixed magnetic head 225 are fixedly provided. However, the same effects and results of the present invention can be obtained for a carriage whose upper portion and a lower portion are separately movable.

As explained above, the present magnetic disk drive system prevents positional shift of the head in the moving direction of the carriage since the width of the arm is increased at its base. Consequently, the absolute value of the thermal off-track or mechanical vibration can be lowered, which can minimize adverse affects in the data retrieval operation. Moreover, the present magnetic disk drive is cost effective since the arm and the carriage can be integrally made of composite resin.

We claim:

1. A disc drive, comprising:

a frame having a disc holder for rotatably driving a disc;

a head for reading information recorded in said disc;

a head carriage provided on said frame, said head carriage being movable in a predetermined radial direction of said disc;

a rotation shaft extending in parallel with said predetermined radial direction;

a driving means for moving said head carriage in said radial direction by engaging one part of said head carriage with said rotation shaft; and an adjustment means for adjusting the positional shift of said head due to a deformation of said head carriage caused by a change of ambient temperature, said adjustment means including a carriage arm and an adjustment member mechanically fixed with each other, said adjustment member having a different thermal expansion coefficient from that of said carriage arm, and said carriage arm being extended, in a direction perpendicular to said radial direction, from the rear portion of said head carriage toward said rotation shaft.

2. A disc drive as defined in claim 1, wherein:

an outer surface of said rotation shaft is notched to form a male screw; and a part of said head carriage includes said carriage arm and a pin, said pin being provided at an end of said carriage arm and engaged with the male screw of said rotation shaft.

3. A disc drive as defined in claim 2, wherein said adjustment member having a different thermal expansion coefficient from that of said carriage arm so that the positional shift of the head is compensated by using a deformation effect of said carriage arm caused by the change of the ambient temperature, utilizing an engaging portion of said pin and drive shaft as a supporting point.

4. A disc drive as defined in claim 3, wherein said adjustment member is made of resin or metal when said frame is made of iron and said carriage arm is made of polycarbonate.

5. A disc drive as defined in claim 4, wherein said adjustment member is fitted in a recessed portion provided along a longitudinal direction of said carriage arm.

6. A disc drive as defined in claim 5, wherein hooks are provided on both ends of said adjustment member and on corresponding parts of said recessed portion so that said adjustment member and said recessed portion engage with each other.

7. A disc drive as defined in claim 5, wherein an outer surface of said adjustment member is notched to form a bar screw, said bar-screw of said adjustment member being inserted from one end of said carriage arm to the other end so that said adjustment member crosses said recessed portion.

8. A disc drive as defined in claim 5, wherein a slit or hole is provided at the bottom of said carriage arm so as to expedite a deformation of said carriage arm.

9. A disc drive as defined in claim 4, said adjustment member is integrally formed with said carriage arm by a bicolor molding method when said adjustment member is made of resin.

10. A disc drive as defined in claim 2, wherein said adjustment means is comprised of said rotation shaft and a bearing, and characterized in that:

said drive shaft is rotatably driven by a motor, said motor being pressed by a spring so that said drive shaft is pressed toward said bearing;

one end of said drive shaft supported by said bearing, said bearing being made of a material having a different thermal expansion coefficient than that of the disc.

11. A disc drive as defined in claim 2, wherein said rotation shaft is rotatably driven by a motor, one end of said rotation shaft being supported by a bearing;

said motor is pressed by a spring so that the rotation shaft is pushed toward said bearing;

said rotation shaft is made of metal or resin material having a different thermal expansion coefficient from that of the disc.

* * * * *